United States Patent
Aiton

(10) Patent No.: US 11,102,959 B2
(45) Date of Patent: Aug. 31, 2021

(54) CANINE BEHAVIOR ADJUSTMENT LEASH

(71) Applicant: Stryker J. Aiton, Glendale, AZ (US)

(72) Inventor: Stryker J. Aiton, Glendale, AZ (US)

(*) Notice: Subject to any disclaimer, the term of this patent is extended or adjusted under 35 U.S.C. 154(b) by 421 days.

(21) Appl. No.: 15/986,726

(22) Filed: May 22, 2018

(65) Prior Publication Data

US 2018/0332826 A1 Nov. 22, 2018

Related U.S. Application Data

(60) Provisional application No. 62/509,450, filed on May 22, 2017.

(51) Int. Cl.
*A01K 27/00* (2006.01)
*A01K 15/00* (2006.01)
*A01K 15/04* (2006.01)

(52) U.S. Cl.
CPC .......... *A01K 27/003* (2013.01); *A01K 15/00* (2013.01); *A01K 15/04* (2013.01); *A01K 27/005* (2013.01)

(58) Field of Classification Search
CPC .. A01K 27/003; A01K 27/005; A01K 27/002; A01K 27/001; A01K 15/00; A01K 15/04
See application file for complete search history.

(56) References Cited

U.S. PATENT DOCUMENTS

| | | | |
|---|---|---|---|
| 3,994,264 A | 11/1976 | Flynt | |
| 4,528,944 A | 7/1985 | Reed et al. | |
| 6,354,247 B1* | 3/2002 | Andrews | A01K 15/02 119/818 |
| 7,963,256 B1* | 6/2011 | Horgan | A01K 27/002 119/792 |
| 8,171,892 B1* | 5/2012 | Horgan | A01K 27/002 119/792 |
| 10,123,514 B1* | 11/2018 | Rice | A01K 27/003 |
| 2005/0087149 A1 | 4/2005 | Hodl | |
| 2008/0047501 A1* | 2/2008 | Madere | A01K 27/002 119/863 |
| 2009/0145372 A1* | 6/2009 | Fithian | A01K 27/003 119/795 |
| 2010/0122667 A1* | 5/2010 | Horgan | A01K 27/002 119/792 |
| 2014/0083371 A1* | 3/2014 | McCrocklin | A01K 27/003 119/795 |
| 2015/0257363 A1 | 9/2015 | Eldevik | |

* cited by examiner

*Primary Examiner* — Magdalena Topolski
*Assistant Examiner* — William L Gmoser
(74) *Attorney, Agent, or Firm* — Bycer Law, PLC; Matthew L. Bycer

(57) ABSTRACT

A leash for training canines to walk beside a handler. The leash includes a single webbing strap that is folded over to provide a hand loop. The hand loop and/or strap length may be sized via a cord lock. Each of the ends of the webbing strap are folded and affixed into leg loops. The leg loops may be variably sized, and placed over the animal's hock. The leash is mounted to the animal via a slidably engaging bolt snap to a collar or harness.

18 Claims, 5 Drawing Sheets

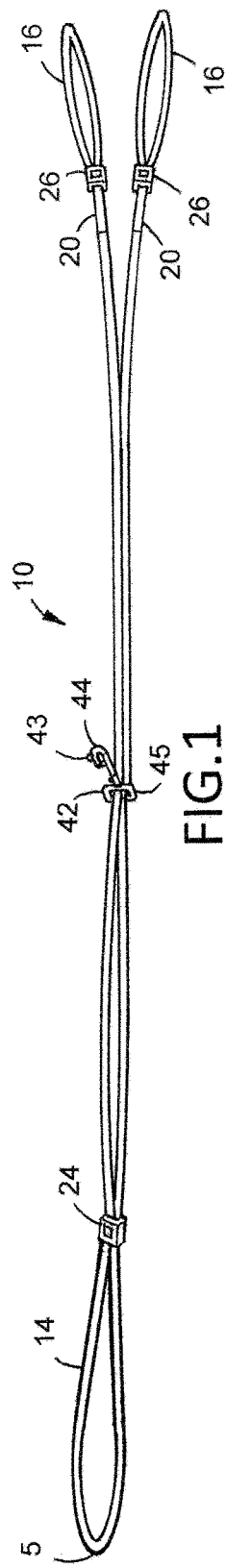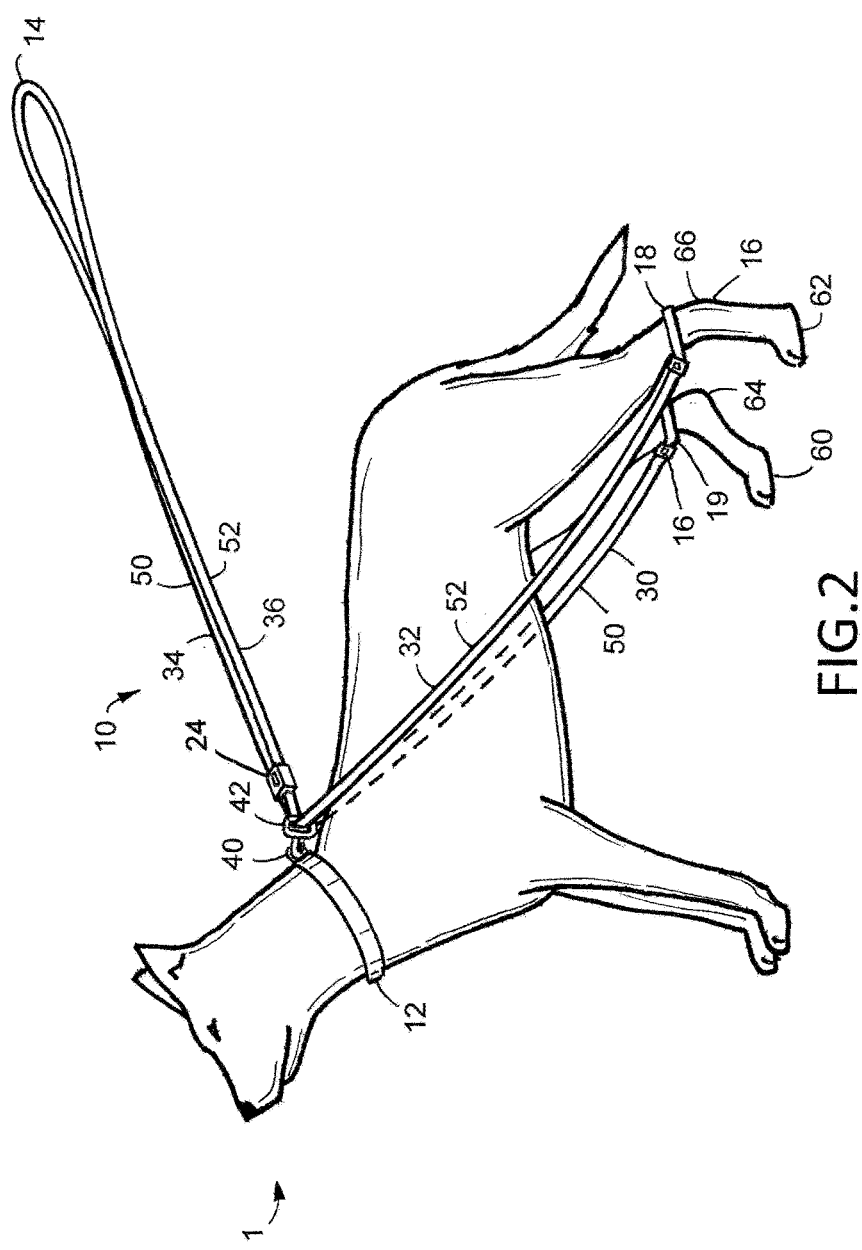

CANINE BEHAVIOR ADJUSTMENT LEASH

CLAIM OF PRIORITY

The present application includes subject matter disclosed in and claims priority to a provisional application entitled "Achilles Heel Behavior Adjustment Leash" filed May 22, 2017 and assigned Ser. No. 62/509,450 describing an invention made by the present inventor, herein incorporated by reference.

BACKGROUND OF THE INVENTION

1. Field of the Invention

The present invention relates to a method and apparatus for training an animal. More particularly, this invention relates to a training and handling lead for a canine.

2. Description of Related Prior Art

A standard straight leash, or elastic/spring loaded leash, may be used to control or restrain a dog. When the size and strength of an untrained dog are considered, the use of a straight leash against a dog's neck may be inhumane. Less humane leaders may be used on more aggressive dogs. For instance, choke chains and muzzle-based leashes which can cause pain and discomfort on a dog, and used to prevent certain behaviors. As an alternative, some solutions include use of more humane harnesses. Yet harnesses do little to restrain the dog's aggression.

Conventionally dog harnesses and leashes have been made to allow the user to walk with the dog, and control the movement of the dog, so that the dog cannot get away or be subject to danger off leash. Leashes are also desirable, for safety purposes, to be able to handle the dog in the instance where other people or animals are present—to prevent any type of undesired interaction. It can be very dangerous for a dog owner to walk a medium to larger sized dog that can weight as much as, or more than the owner, and over-power the person holding the leash or harness. Oftentimes, the dog will lunge by lifting its front section and leaping with its hind legs—the power center of a dog's motility. The hind leg muscles, which provide the majority of the pulling power in medium to large dogs, are very strong.

There have been many attempts to provide control over dogs in the past. For example, there are apparatuses on the market that control and/or train a dog via a muzzle positioned on the dog's face. Many dogs, however resist wearing muzzles due to facial discomfort. Other solutions, such as U.S. Pat. No. 6,354,247, issued to Andrews on Mar. 12, 2002, describes a method and apparatus for controlling an animal. The front harness includes a pair of loops that go around the lower portion of a dog's hind legs to control the dog's actions. There are issues in mounting controls around the animal's hind legs. The loops below the hocks (ankles) will not control the animal because the main muscles used for power are located in the upper thigh region (quadriceps/hamstrings). In addition, the use of elastic shock cords provides less control than an inelastic leash might provide, or may otherwise encourage or strengthen the dog's resolve.

Choker chains have been widely used tor the purpose of controlling dogs on leash. However, many dogs may initially disregard the trainer's directives and continue pulling despite the choker chain, which can lead to serious injury to the dog. A direct backwards force against the dog's neck may actually incentivize or encourage lunging. Furthermore, many people are not comfortable with using choker chains, as they are concerned that the chain may injure the dog.

It is therefore an object of the present invention to provide a training device that coordinates with a prior applied restraint (e.g. collar, harness, etc.) that can be held by a user to control the forward movement of a dog.

It is another object of the present invention to provide a training device to teach a dog to walk with its handler.

It is yet another object of the present invention to provide a training device to manipulate a dog's motility.

It is a yet further objection of the present invention to provide a device that can be used to teach a dog to heel.

It is a still yet further object of the present invention to train a dog to walk along with a handler (with and/or without a lead).

It is as yet a further object of the present invention to provide a single leader device that can be used with multiple sized dogs.

It is another object of the present invention to provide a simple leash that constrains the dog's hind leg movements to cause the dog to stand, sit, or lie still.

These and other objects of the present invention will become apparent to those skilled in the art as the description thereof proceeds.

SUMMARY OF THE INVENTION

The present invention is directed to an apparatus to allow a user to train a canine to walk beside the user. The user can manipulate a training leash (preferably attached at the collar) via control of canine's hind legs. The leash is attached to the animal via a dorsal coupling along the canine's dorsal side (such as above shoulder, neck, etc.). A coupler (such as a hook, swivel bolt snap, link, ring, etc.) is mounted along the dorsal coupling. The coupler will include a loop adapted to allow sliding passage of at least two webbing straps (when the webbing is folded over itself). A first left webbing strap includes a left leg loop attached above the canine's left hock. The left leg loop may be variably sized by use of a first cord lock establishing the size of the left leg loop along the first left webbing strap. A second right webbing strap includes a right leg loop attached above the canine's right hock. The right leg loop may be variably sized by use of a first cord lock establishing the size of the right leg loop along the second right webbing strap.

Preferably, the first left webbing strap and second right webbing strap are part of a single webbing strap folded over. Both the first left webbing strap and second right webbing strap pass through the coupler. A hand loop is formed above the coupler where the two webbing straps are joined, preferably at fold over. A third cord lock may be used to size the hand loop, the third cord lock placed over the first left webbing strap and second right webbing strap above the coupler. Pads, preferably tubular pads around the webbing strap, may be used to pad the contact with the animal's hind legs and used in the left leg loop and/or right leg loop. Pulling of the hand loop will cause the webbing strap to pass through the coupler and decrease the amount of webbing allowed for the animal along the body straps. Thereby, the pulling causes a force applied to each of the canine's hind legs so as to cause the canine to prevent forward movement and/or adopt a sitting position.

The present invention also includes a method of assisting a person to train dogs to walk beside them. First, one applies the leg loops, the left leg loop over a first dog's left hind leg above the hock, and the right leg loop over a first dog's right hind leg above the hock. The size of the leg loops may be adjusted, preferably by means of a cord lock on each loop. Then, the first left webbing strap is drawn from the left leg loop along the first dog's left flank towards the first dog's dorsal side, and the second right webbing strap is drawn from the right leg loop along the first dog's right flank towards the first dog's dorsal side. Both webbing straps are coupled to a mount at a point along the first dog's dorsal side. Coupling is preferably by means of a bolt snap, more preferably a swivel bolt snap with rectangular or wide attachment to allow the webbing to slide therethrough. The user may hold, or affix a hand loop formed at the juncture between said first and second webbing straps. The juncture is preferably created by folding over a single webbing strap. The user may adjust the size of the hand loop by use of a cord lock, or other means known in the art, along both the first left and second right webbing straps. The user may also tie the hand loop to a pole, or grooming pole, or fixed point, to prevent the dog from moving, or to cause the dog to recline in sitting position or lying position. The leash may be mounted on a collar, harness, or other gear.

The same leash can be used with multiple sized dogs, such as at a groomer's office, veterinarian's office, or by a professional trainer. The left and right leg loops may be removed from the first dog. Then, the first left and second right webbing straps are uncoupled from the mount, preferably by application of the button of a bolt snap. The leash is then applied to a second dog, first applying a left and right leg loops over a second dog's left and right hind legs (preferably above the hock). The first left and second right webbing straps are coupled to a mount at a point along the second dog's dorsal side. Preferably, no resizing, or multiple sized leashes are required for varied sized dogs, and the same leash can be used for all dogs.

BRIEF DESCRIPTION OF THE DRAWINGS

The present invention will be described with greater specificity and clarity with reference to the following drawings, in which:

FIG. 1 illustrates an embodiment of the adjustable leash of the present invention;

FIG. 2 illustrates a side view of the leash of FIG. 1 applied onto a canine;

DETAILED DESCRIPTION OF THE PREFERRED EMBODIMENTS

Figure 3:
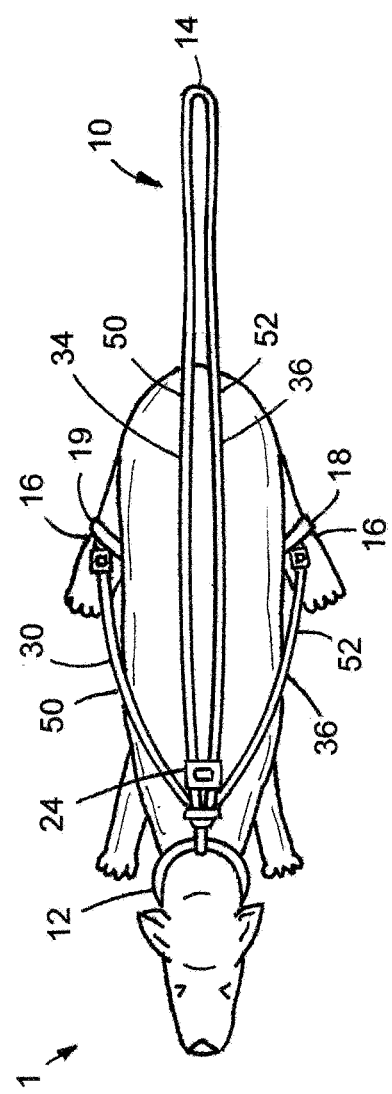
FIG. 3 illustrates a top view of an embodiment of the leash applied to a dog.

The present invention is directed to a training leash that may be used to ensure that a dog, or canine, can be properly handled and trained to walk alongside the owner/user. When applied to a dog, the owner may simply handle the leash and ensure that the dog does not run off away from the user in any direction. By securing the rear hind legs of the dog, the main power source, lunging, etc., is restricted. Given the short length of the leash, the user may maintain the physical relationship between the user and dog so as to cause the dog to walk beside the user, or to heel, as is known in the art of dog training.

The present invention provides various improvements over the prior art, as the system can be used with a leash, harness, muzzle, or mate with any equipment that allows for coupling on the dorsal, or top, side of the animal. A single webbing strap can be purposed to create the leash by simply forming small (permanent) loops along the ends (for leg loops) and fold the center to provide for a handheld (and cinched) hand loop. The leash can be used by a trainer, owner, or otherwise affixed to a fixed position above the dog's coupling point, such as to a pole to hold the dog in place, in such a way, a groomer may simply affix the dog and force the dog to remain stationary, or to adopt a sitting position, etc.

The present invention may be made from inelastic webbing (or slightly elastic as such webbing is known in the art of dog leashes), without the use of any shock cord or elastic cords. The use of webbing also expands the surface area interaction with the animal and thus lessen the impact of the leash against the animal's skin/body. The system preferably uses a bolt snap with a hook that is not prone to quick or inadvertent release. The lack of leash length ensures a less outward force when dog propels forward in anyway, leading to a reduced chance of animal "injury". Conversely, prior art reflexing elastic and lead allow the dog to gain a larger momentum, that consequently is reinforced on the animal when demonstrating a lack of control in the animals actions. The present invention provides for simplified usability, using a singular unit with simplified application, as the leash attaches to a pre-existing collar or other gear already used on the animal. The leash of the present invention is preferably short sized for training and behavior betterment purposes, specifically to train walking beside a handler. By use of a single webbing strap, the system can be easily and inexpensively manufactured.

As can be shown in FIG. 1, leash 10 is made up of a single length of webbing (as is known in the art for dog leashes) that has been bent over itself and affixed along two pronged ends. At midway point 15, hand loop 14 is created via movement of a slideable adjustment nut (cord lock) to adjust the size of hand loop 14. Cord lock may be similar to locks known in the art, such as spring locks, which may be sized to fit over webbing. The leash may be attached to the animal via coupler 42 such as a swivel bolt snap as shown. A bolt snap is common in the art of leashes, and used for connecting one piece to another. The lower portion is preferably swiveled, and sized just larger than the size of double webbing strap. Hook 44 may be accessed through manipulation of button 43 to couple with the animal, or a harness, collar, or other gear applied to an animal. Preferably, coupler includes rotating body 45 that includes space to allow the doubled over webbing strap to slidably pass therebetween. Each end of the webbing strap is turned over to provide leg loops 16. Ends 20 are bound onto its respective portion of the webbing. Preferably, ends 20 are affixed to the webbing via glue, thermal melting, sewn, tape, or other affixing mechanisms as are known in the art. Above ends 20, leg loop adjustment nuts 26 (such as cord locks) may be used to adjust the size of leg loops 16.

As shown applied to a dog in FIGS. 2 and 3, leash 10 may be used in conjunction with collar 12. In many instances, collar 12 may include collar ring 40 as an accessory for mounting a leash. Coupler 42 may be attached along collar ring 40 or around collar itself. When a harness is used, coupler 42 may be applied directly to the harness or an accessory mount loop or ring as may be used. Leg loops 16 are attached just above hock of the dog's hind legs. Left leg loop 18 is applied just above left hock 66 on left leg 62, and right leg loop 19 is applied just above right hock 64 on right hind leg 60. In order to apply leg loops, the loop may be extended or opened via adjustment nuts 26 to allow for leg loop to slip over paw and hind leg. Once adjusted over the hock, the adjustment nut 26 may be adjusted to minimize the size of the leg loops so as to fit snugly along the dog's hind legs. In some embodiments, a tubular pad may be used affixed within the leg loops to provide for a cushion, further surface area contact, or comfort of the dog. Leash 10 includes leads, left lead 52 and right lead 50. Left lead 52 runs from left leg loop 18 across dog's left lateral body and forms a portion of left body strap 32. Similarly, from right leg loop 19, right lead 50 provides for right body strap running laterally across dog's body (here shown in dotted line behind animal). Both leads 50 and 52 join in slideable engagement with coupler 42 just above neck or collar. In alternative embodiments where a harness is used, coupler may be positioned above the shoulder or along the back. In most preferred embodiments, coupler will mount on the dog's dorsal top. Left lead 52 and right lead 50 continue above coupler 42 providing for left lead 36 and right lead 34. Left lead 36 and right lead 34 continue past hand loop adjustment nut 24 and end in a doubled over hand loop 14. As can be seen, a single strap of webbing may be used to create the entire leash. Adjustment nut 24 may be arranged forward near coupler 42 to adjust the length of the body straps 30 and 32 to avoid dragging.

As the leash is used, a user may hold the hand loop, and control and/or prevent any forward motion by the dog. Simply by pulling up the hand loop, the leads draw the leg loops forward and upwards, thus sapping lunge power from the dog. The lead is drawn further through coupler to shorten the length of body straps and increase the length of leads as the dog changes position and/or sits. By using the leash of the present invention, the user can continually tug at the leash and communicate with the dog as to the application of the leash and the owner's desire that the dog does not pull forward. As can be seen in FIG. 3, the leash is applied to a small dog in top view. The leash is affixed to the collar 12, and leads 34 and 36 are held by hand loop 14.

Figure 4:
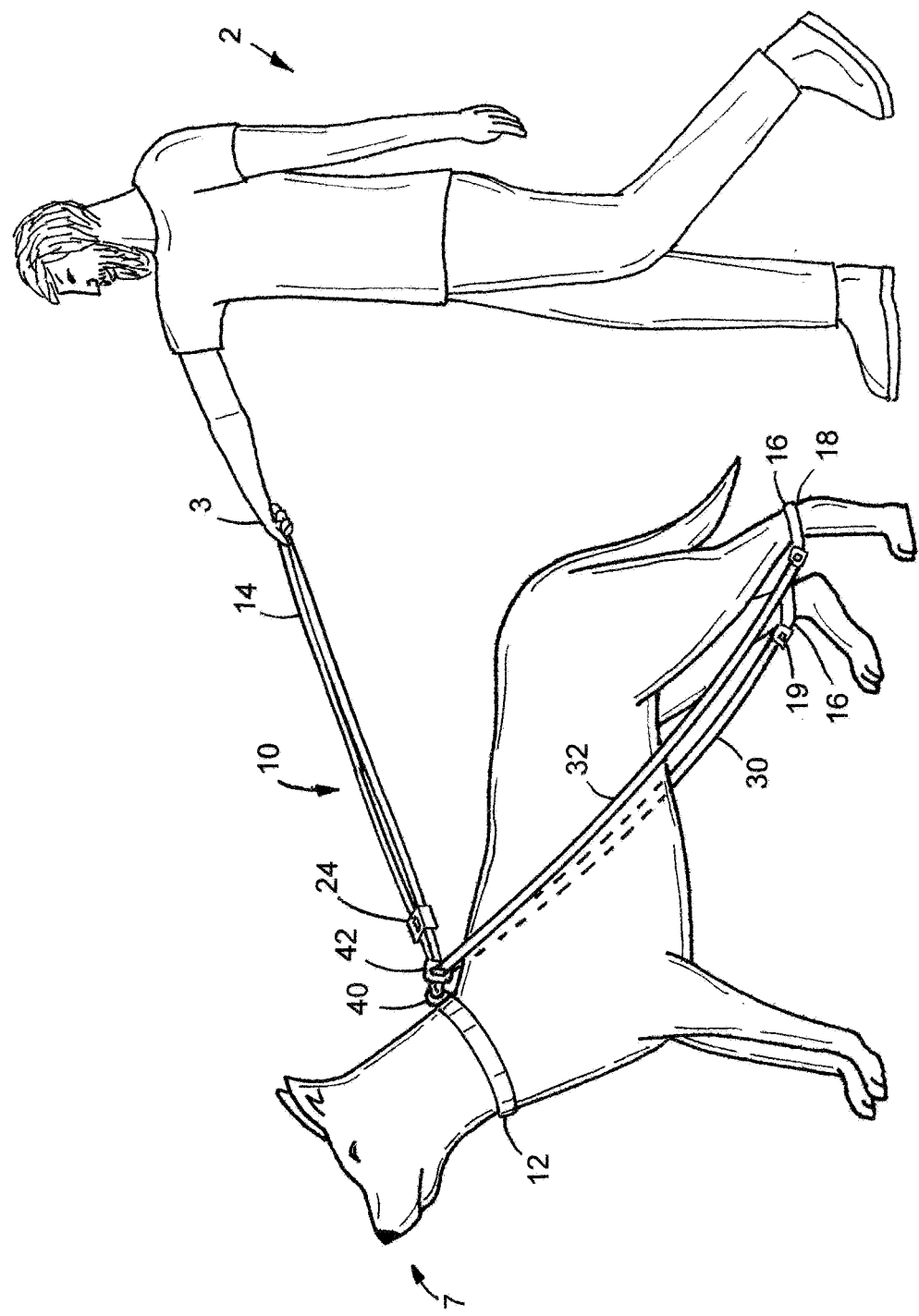
FIG. 4 illustrates a side view of a user handling a dog via the leash.

As can be seen in FIG. 4, user 2 may use hand 3 to hold hand, loop 14 and handle dog. By tugging at hand loop, user causes leash to slide through coupler, thus shortening body strap 30 and 32 and pulling up on leg loop 16 around dog's hind legs. In this manner, user saps mobility and prevents dog from lunging. Dog 1 may be fitted with collar 12 that may include collar ring 40 to allow for attachment of coupler. Hand loop 14 may be adjusted in size by hand loop adjustment nut 24. In the preferred embodiments, coupler is a swivel bolt snap as is known in the art, particularly with dog leash webbing straps. However, what is key with regard to coupler 42 is the ability of the webbing straps to slide past coupler in order to adjust the length of body straps 30 and 32 and allow the user to restrict movements by shortening body straps and providing a forward and upwards force along dog's rear hind legs. Leg loops are affixed above the hock as is known in the art based on the anatomy of the animal. Leg loops resist sliding up given the widening shape of the dog's rear legs towards hip joints. Furthermore, leg loops may be adjusted via leg loop adjustment nuts 26 to provide for a better fit.

Figure 5:
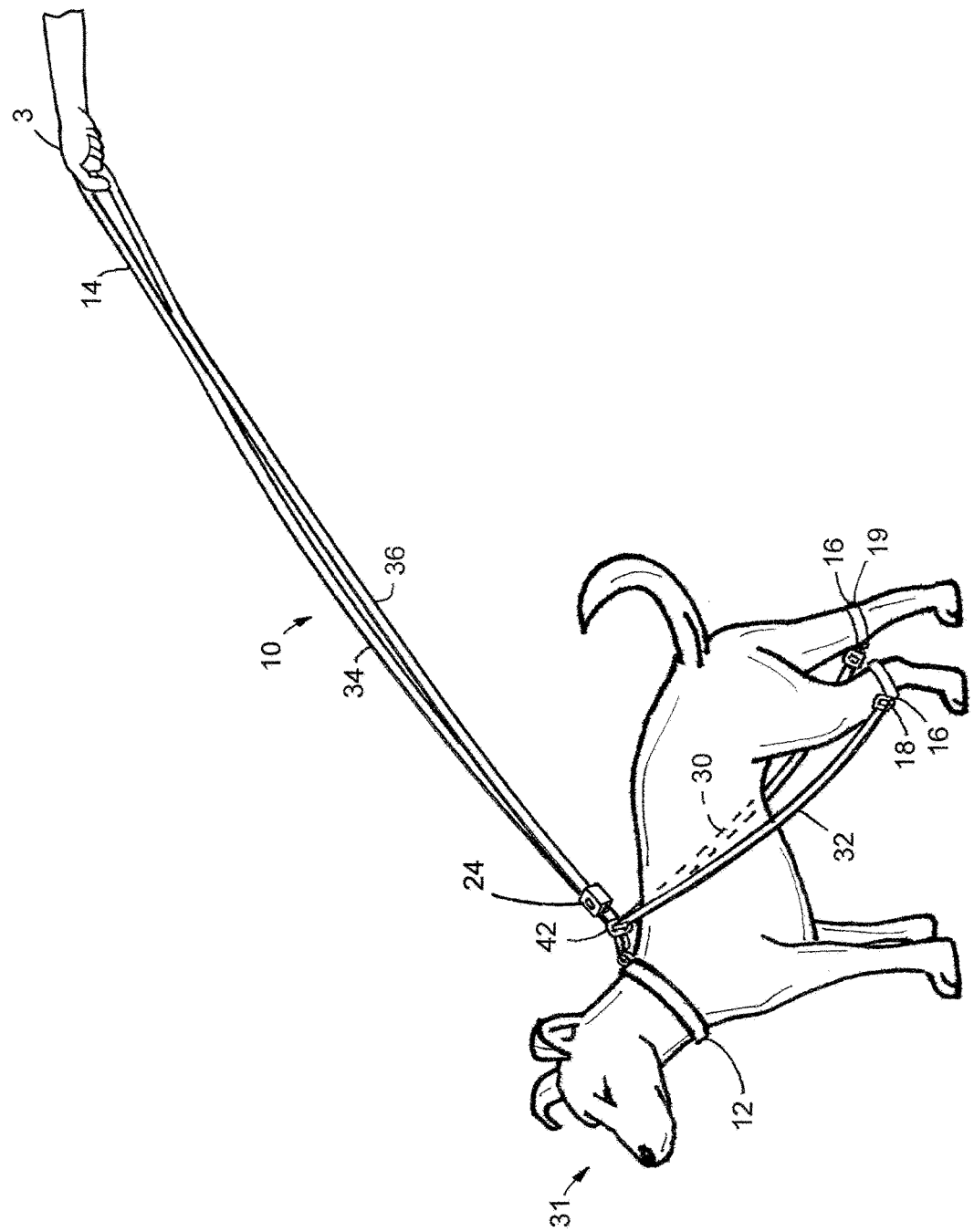
FIG. 5 illustrates a side view of an embodiment of the leash held by a user as applied to a small dog.
Figure 6:
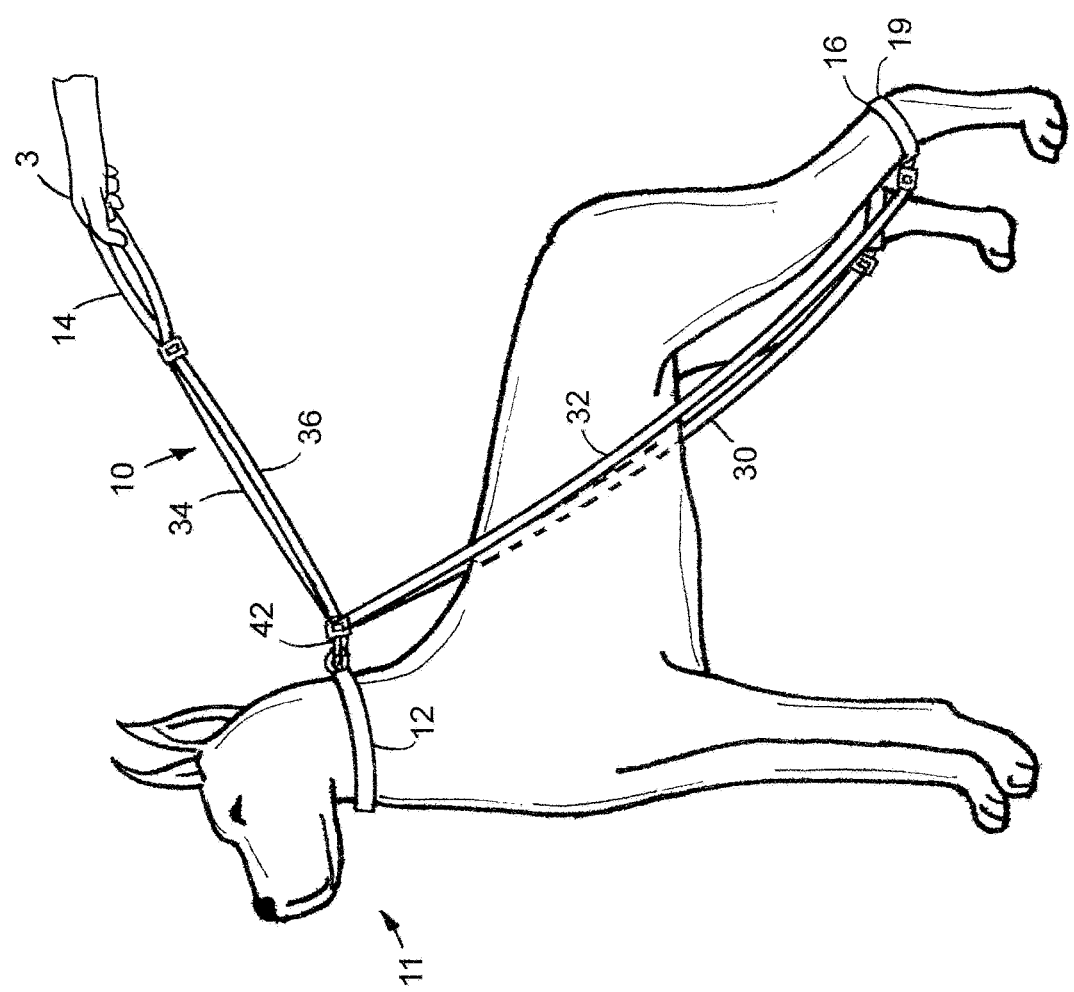
FIG. 6 illustrates a side view of an embodiment of the leash held by a user as applied to a large dog.

As can be seen in FIGS. 5 and 6, small dog 31 and large dog 11 may be trained with the same lead. As can be seen, leg loops 16 may be adjusted in size to fit large and small dogs. Body straps 30 and 32 comprise the section of the leash between leg loops and coupler 42. As the leash is pulled (thus limiting the length for body straps), right lead 34 and left lead 36 may be enlengthened. When leash is applied to large dog 11, the amount of leash provided for body straps 30 and 32 includes a majority portion of the leash length. Whereas a small dog as shown in FIG. 5 as dog 31, the length between the hock and collar is much shorter relative to the leash. This provides one advantage of the present invention whereby a single length leash may be used on both large and small dogs. Given that only a single strap of webbing is required to provide the entire leash, along with accessories, adjustment nuts, etc., the leash may be applied to both large and small dogs. When a user is holding a small dog, the distance between the dog's nape, neck, or dorsal side, is much greater due to the differences in height between the dog and the user. Therefore, the majority of the leash may be used as the right and left leads 34 and 36. However, when a large dog is affixed with this leash, such as shown in FIG. 6 with large dog 11, the distance between the nape of the dog's neck (as shown) or any dorsal side to the height of the user's hand is much lower. Therefore, a lead can be much shorter, particularly where the present apparatus is used to teach the dog to walk beside a handler. The vertical distance between the dog's collar and the handler's hand is typically determined by the size of the dog.

The leash provides use of a single webbing strap that is folded over to provide the hand held (or fixed) loop and provides for ease of use in multiple sized animals as the size of the leash lead end is inversely proportional to the length between hock and attachment point. The above examples and embodiments have been given by way of an illustrative example of this invention, all such and other modifications and variations hereto, as would be apparent to persons skilled in the art, are deemed to fall within the scope and ambit of this invention set forth herein.

I claim:

1. An apparatus to allow a user to train a canine via manipulation of a training leash and collar via control of canine's hind legs, said apparatus comprising:
   a. a dorsal coupling along the canine's dorsal side;
   b. a coupler mounted along said dorsal coupling, said coupler comprising a loop adapted to allow sliding passage of at least two webbing straps;
   c. a left webbing strap comprising a left leg loop configured to attach above the canine's left hock, and a first cord lock establishing the size of the left leg loop along the left webbing strap;
   d. a right webbing strap comprising a right leg loop configured to attach above the canine's left hock, and a second cord lock establishing the size of the right leg loop along the right webbing strap;
   e. wherein both of said left webbing strap and said right webbing strap are comprised of solid inelastic webbing material, and both of said left webbing strap and said right webbing strap slidably pass through said coupler;
   f. a hand loop formed above the coupler whereupon said left webbing strap and said right webbing strap are joined; and
   g. a third cord lock placed over said left webbing strap and said right webbing strap above the coupler, said third cord lock providing for variable sizing of said hand loop and setting a maximum length of the right and left webbing straps;
   wherein said third cord lock is set between the coupler and said hand loop, and said hand loop formed by said third cord lock.

2. The apparatus of claim 1 further comprising a tubular pad surrounding the left webbing strap left leg loop.

3. The apparatus of claim 2 further comprising a second tubular pad surrounding the right webbing strap right leg loop.

4. The apparatus of claim 1 wherein said hand loop configured to be pulled to slide both of said left webbing strap and said right webbing strap above the coupler causes a force applied to each of the canine's hind legs so as to decrease distance between the coupler and said right and left leg loops.

5. The apparatus of claim 1 wherein said coupler comprises a swivel bolt snap.

6. A method of assisting a person to train dogs to walk beside, the method comprising the steps of:
   a. applying a left leg loop over a first dog's left hind leg above the hock;
   b. applying a right leg loop over a first dog's right hind leg above the hock;
   c. drawing a solid inelastic left webbing strap from the left leg loop along the first dog's left flank towards the first dog's dorsal side;
   d. drawing a solid inelastic right webbing strap from the right leg loop along the first dog's right flank towards the first dog's dorsal side;
   e. coupling both of the left and right webbing straps to a mount at a mounting point along the first dog's dorsal side whereby left and right webbing straps both slidably pass through said mounting point at a coupler without catching on the mounting point;
   f. forming a hand loop via a cord lock along both the left and right webbing straps above the coupler and before the hand loop;
   g. adjusting the size of the hand loop and setting a maximum length of the right and left webbing straps by use of the cord lock, forming the hand loop;
   h. holding the hand loop formed at the juncture between said left and right webbing straps.

7. The method of claim 6 wherein said step of applying a left leg loop comprises adjusting a size of the left leg loop via a cord lock.

8. The method of claim 6 wherein said step of applying a right leg loop comprises adjusting a size of the right leg loop via a cord lock.

9. The method of claim 6 wherein said step of coupling is accomplished by attaching a swivel bolt snap onto a ring.

10. The method of claim 9 wherein the ring is mounted along a collar.

11. The method of claim 9 wherein the ring is mounted along a harness.

12. The method of claim 6 further comprising the steps of:
    a. removing the left and right leg loops from the first dog;
    b. uncoupling the left and right webbing straps from the mount;
    c. applying a left leg loop over a second dog's left hind leg above the hock;
    d. applying a right leg loop over a second dog's right hind leg above the hock;
    e. coupling both of the left and right webbing straps to a mount at a point along the second dog's dorsal side.

13. The method of claim 6 wherein said step of adjusting affixes a first maximum length of a body strap section set between the mounting point and the left leg loop and a second maximum length of a second body strap section set between the mounting point and the right leg loop.

14. The method of claim 6 whereby the steps of applying, the steps of drawing, and the step of coupling are conducted on single length of continuous webbing strap.

15. The apparatus of claim 1 wherein said right and left webbing straps and said hand loop are comprised of a single continuous elongated webbing strap.

16. The apparatus of claim 1 wherein said right and left webbing straps and said hand loop and said right and left leg loops consist of a single elongated webbing strap.

17. The apparatus of claim 1 wherein said right and left webbing straps comprise flexible flat strips.

18. The apparatus of claim 17 wherein said right and left webbing straps are solid.

* * * * *